(12) United States Patent
Prabhu

(10) Patent No.: US 7,472,230 B2
(45) Date of Patent: Dec. 30, 2008

(54) PREEMPTIVE WRITE BACK CONTROLLER

(75) Inventor: Manohar K. Prabhu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 972 days.

(21) Appl. No.: 09/952,994

(22) Filed: Sep. 14, 2001

(65) Prior Publication Data

US 2003/0056062 A1    Mar. 20, 2003

(51) Int. Cl.
*G06F 12/00* (2006.01)

(52) U.S. Cl. .................. 711/143; 711/118; 711/128; 711/133; 711/135; 711/137; 711/141; 711/142; 711/160

(58) Field of Classification Search ......... 711/141–146, 711/117–122, 128, 130, 133, 135, 136, 137, 711/147–149, 160
See application file for complete search history.

(56) References Cited

U.S. PATENT DOCUMENTS

| | | | | |
|---|---|---|---|---|
| 4,809,168 | A * | 2/1989 | Hennessy et al. | 718/104 |
| 5,317,720 | A * | 5/1994 | Stamm et al. | 711/143 |
| 5,353,423 | A * | 10/1994 | Hamid et al. | 711/143 |
| 5,434,993 | A * | 7/1995 | Liencres et al. | 711/133 |
| 5,561,779 | A * | 10/1996 | Jackson et al. | 711/122 |
| 5,828,821 | A * | 10/1998 | Hoshina et al. | 714/15 |
| 6,088,773 | A * | 7/2000 | Kano et al. | 711/161 |
| 6,119,205 | A * | 9/2000 | Wicki et al. | 711/143 |
| 6,134,634 | A * | 10/2000 | Marshall et al. | 711/143 |
| 6,145,058 | A * | 11/2000 | Suganuma | 711/134 |
| 6,490,657 | B1 | 12/2002 | Masubuchi et al. | |
| 6,763,437 | B1 * | 7/2004 | Nguyen et al. | 711/147 |
| 6,782,465 | B1 * | 8/2004 | Schmidt | 711/208 |

FOREIGN PATENT DOCUMENTS

EP    1030243 A1    8/2000

OTHER PUBLICATIONS

Marcelo Cintra, et al., "Architectural Support for Scalable Speculative Parellelization in Shared-Memory Multiprocessors", May 2000.*

* cited by examiner

*Primary Examiner*—Sanjiv Shah
*Assistant Examiner*—Zhuo H Li

(57) ABSTRACT

A preemptive write back controller is described. The present invention is well suited for a cache, main memory, or other temporarily private data storage that implements a write back strategy. The preemptive write back controller includes a list of the lines, pages, words, memory locations, or sets of memory locations potentially requiring a write back (i.e., those which previously experienced a write operation into them) in a write back cache, write back main memory, or other write back temporarily private data storage. Thus, the preemptive write back controller can initiate or force a preemptive cleaning of these lines, pages, words, memory locations, or sets of memory locations.

60 Claims, 3 Drawing Sheets

PREEMPTIVE WRITE BACK CONTROLLER

BACKGROUND OF THE INVENTION

1. Field of the Invention

The present invention generally relates to memory systems. More particularly, the present invention relates to the field of avoiding exceeding an optimal maximal threshold of utilization of a portion of a computer system due to a write back operation.

2. Related Art

A cache, main memory, or other temporarily private data storage generally implements a particular write policy/strategy. The temporarily private data storage refers to any component of a computer system that temporarily maintains some particular data in a private state (i.e., some portion of the computer system can see the data while other portion of the computer system cannot see the data) but in the future wants to make available the particular data to other portion of the computer system. A scratch pad memory of a processor is an example of a temporarily private data storage.

Examples of write strategies include a write through strategy and a write back strategy. The simplest case is the write through strategy. In a write through cache, a write operation from the processor leads to the transfer of the data to the next level in the memory hierarchy, which may be the main memory, even with a cache hit. Moreover, an entry in the write through cache is written to and updated.

In a write back cache, on a write operation from the processor only the entry (on a cache hit) in the write back cache is written to and updated while the content of the main memory or other level of memory remains unaltered. The dirty (has been written to) entry of the write back cache is written back to main memory on a subsequent occasion to clean or flush the write back cache. Only after an explicit instruction to clean the write back cache or in certain cases of capacity, conflict, or coherence misses is the dirty or updated cache entry copied to the main memory or other level of memory to update the content there.

In a computer system, preemptive cleaning in the case of a write back cache, write back main memory, or other write back temporarily private data storage is achieved by allowing lines, pages, words, memory locations, or sets of memory locations within the cache or main memory to be written back to the next level of memory or non-volatile storage (e.g., disk, flash memory, battery backed-up DRAM, tape, etc.) prior to a synchronization operation, a checkpointing operation, a context switch, a page fault or page replacement, etc. Typically, but not necessarily, this would be done in the background, when all or some of the involved hardware is idle or not fully utilized.

Some conventional techniques wait until the synchronization operation, the checkpointing operation, the context switch, the page fault or page replacement, etc. is executed by a processor or processors to begin the process of cleaning or flushing the dirty lines or dirty pages in each processor's cache and/or in main memory and/or in other temporarily private data storage. This increases latency and stall time of instruction execution. Moreover, this causes a portion of the computer system to operate above an optimal maximal threshold of utilization. For example, the bus(es), the caches, the main memory, etc. can become saturated or operate at greater than optimal thresholds of utilization at the time of the synchronization operation, the checkpointing operation, the context switch, the page fault, etc., thereby leading to bottlenecks and excessive queueing of requested operations.

Conventional techniques use information stored on a per line, per word, or per page basis to determine which lines or pages or words to write back to the next level of memory or non-volatile storage (e.g., disk, flash memory, battery backed-up DRAM, tape, etc.). This complicates the task of determining which portions of the write back memory system require write backs at the time completion of such write backs becomes necessary.

SUMMARY OF THE INVENTION

A preemptive write back controller is described. The present invention is well suited for a cache, main memory, or other temporarily private data storage that implements a write back strategy. The preemptive write back controller includes a list of the lines, pages, words, memory locations, or sets of memory locations potentially requiring a write back (i.e., those which may have previously experienced a write operation into them) in a write back cache, write back main memory, or other write back temporarily private data storage. Thus, the preemptive write back controller can initiate or force a preemptive cleaning of these lines, pages, words, memory locations, or sets of memory locations. By cleaning dirty lines, pages, words, memory locations, or sets of memory locations at times when the cache, the main memory, other temporarily private data storage, the bus, etc. are less heavily utilized than at the time of the synchronization operation, the checkpointing operation, the context switch, the page fault or page replacement, etc., the operation of cleaning the cache, the main memory, or other temporarily private data storage will already be partially completed at the time that it becomes necessary to complete; thus it proceeds more quickly.

In the case of the checkpointing operation, the preemptive write back controller is well suited for the situations where the processor(s) is unable to do productive work while the checkpoint is being formed. In the case of the context switch, the preemptive write back controller is well suited for the situations where the cache is required to be flushed during the context switch. Examples of where a cache may need to be flushed during a context switch are in situations where the cache is physically indexed or where the cache is virtually indexed but the cache does not have a process identifier stored with the tag in the cache. In the case of the page fault or page replacement, the preemptive write back controller is well suited for the situations where a page is replaced in memory, leading to activity (e.g., cleaning, flushing, etc.) in the cache and/or main memory. In the case of the synchronization operation, the preemptive write back controller may be well suited for the situations where the processor(s) has few write buffers.

The determination of when to begin cleaning the dirty lines, pages, words, memory locations, or sets of memory locations and at what pace to conduct this task are design choices. By cleaning the cache, the main memory, or other temporarily private data storage before cleaning is absolutely required, exceeding an optimal maximal threshold of utilization of a portion of the computer system is avoided. For example, bandwidth saturation and bottlenecks on the bus and latency and stalling of execution of instructions can be reduced or eliminated. Moreover, the bus(es), the processor, the memory system controllers, etc. can operate at more optimal levels of utilization rather than at high levels of utilization. Thus, the required memory updates can be done during times when the bus and other hardware involved are idle or less fully utilized than at the time of the synchronization operation, the checkpointing operation, the context switch, the page fault or page replacement, etc. This results in better distributed demand for and utilization of the bus(es) and other portions of the computer system, and a more uniform memory access pattern in time.

These and other advantages of the present invention will no doubt become apparent to those of ordinary skill in the art after having read the following detailed description of the preferred embodiments, which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
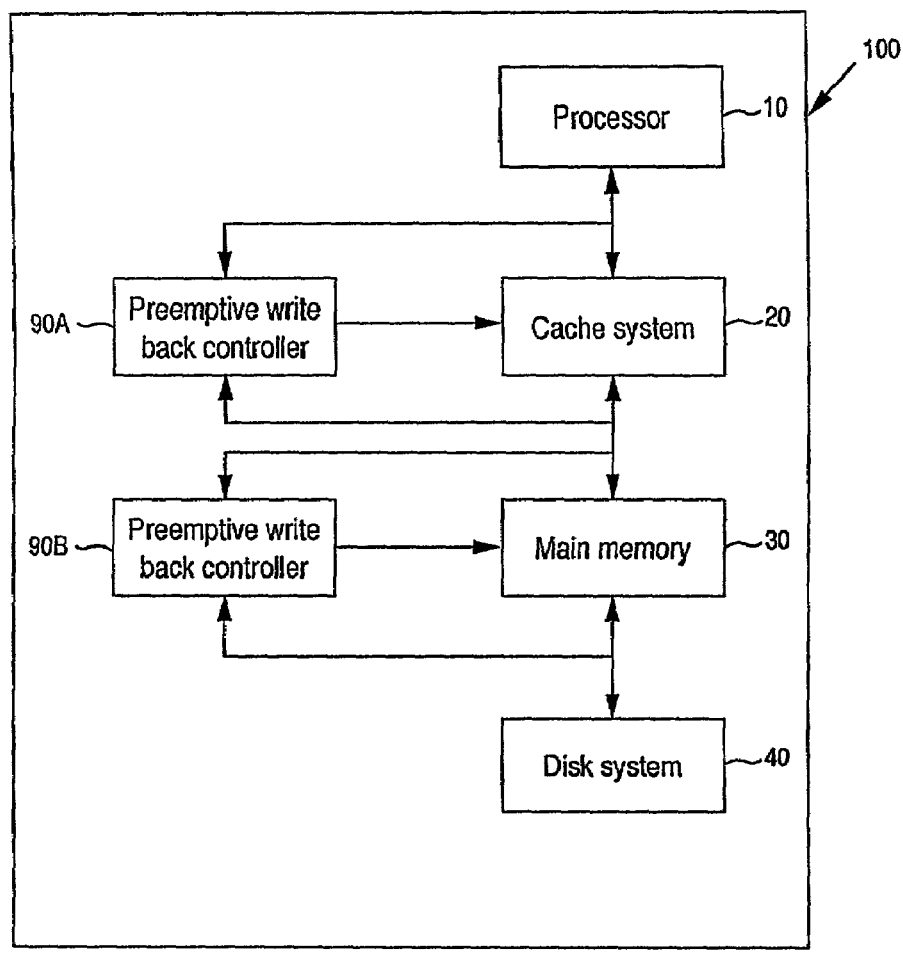
FIG. 1 illustrates a first computer system, showing the preemptive write back controller in accordance with an embodiment of the present invention.

FIG. 1 illustrates a first computer system 100, showing the preemptive write back controller 90A and 90B in accordance with an embodiment of the present invention. The first computer system 100 includes a processor 10, a cache system 20, a main memory 30, and a disk system 40, whereas these components are coupled to a bus(es). The cache system 20 can be a multiple-level cache system having a plurality of cache levels such as a level 1 cache, a level 2 cache, a level 3 cache, etc. Alternatively, the cache system 20 can be a single-level cache system having a cache. It should be understood that the first computer system 100 can be configured in any other manner. The present invention is well suited for a cache, main memory, or other temporarily private data storage that implements a write back strategy.

Moreover, the first computer system 100 includes a first preemptive write back controller 90A coupled to the cache system 20 and a second preemptive write back controller 90B coupled to the main memory 30. The first preemptive write back controller 90A is designed and optimized for operation with the cache system 20 while the second preemptive write back controller 90B is designed and optimized for operation with the main memory 30. It should be understood that the first computer system 100 can have a preemptive write back controller for each level of the cache system 20. The preemptive write back controllers 90A and 90B preemptively initiate the cleaning of the cache system 20 and the main memory 30 in advance of the immediate requirement to do so (e.g., due to the synchronization operation, the checkpointing operation, the context switch, the page fault or page replacement, etc.) by utilizing a list of lines, pages, words, memory locations, or sets of memory locations to possibly undergo this write back operation. In the cache system 20, the level 1 cache writes back to the level 2 cache. The level 2 cache writes back to the main memory 30. Alternatively, the level 2 cache writes back to the level 3 cache, etc., with the final level of cache writing back to the main memory 30. Alternatively, any level of the cache system 20 or main memory 30 or other temporarily private data storage may utilize a write through policy/strategy, as long as at least one of the memory systems coupled to the preemptive write back controller utilizes a write back policy/strategy. Alternatively, the cache system 20 simply writes back to the main memory 30. The main memory 30 writes back to the disk system 40. It should be understood that the preemptive write back controller does not have to be implemented with all the memory systems of the computer system. Moreover, the processor 10 can bypass the cache system 20 and interact directly with the main memory 30 or any other memory system.

Figure 2:
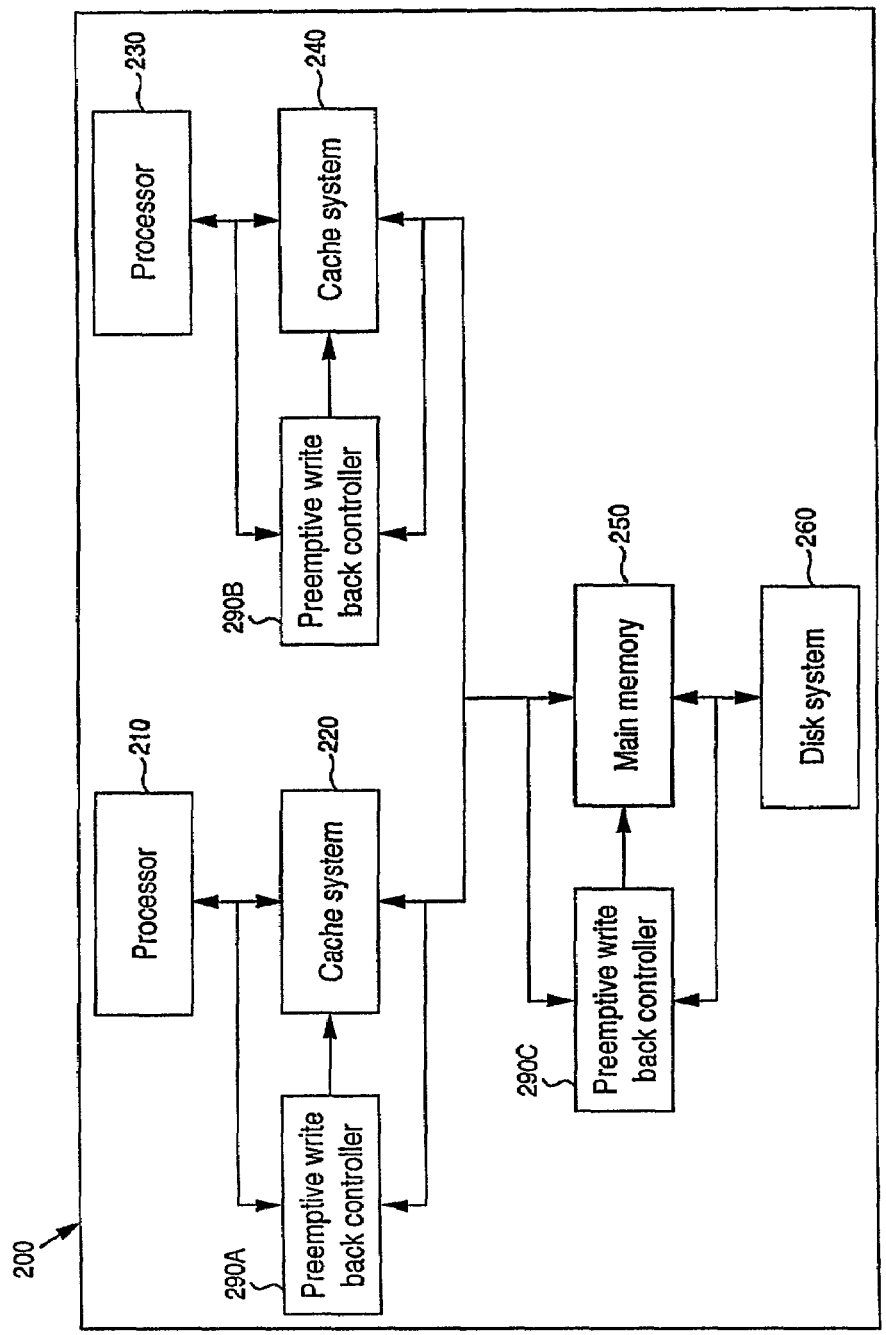
FIG. 2 illustrates a second computer system, showing the preemptive write back controller in accordance with an embodiment of the present invention.

FIG. 2 illustrates a second computer system 200, showing the preemptive write back controller 290A and 290B and 290C in accordance with an embodiment of the present invention. The second computer system 200 includes a first processor 210, a first cache system 220, a second processor 230, a second cache system 240, a main memory 250, and a disk system 260, whereas these components are coupled to a bus(es). Each cache system 220 and 240 can be a multiple-level cache system having a plurality of cache levels such as a level 1 cache, a level 2 cache, a level 3 cache, etc. Alternatively, each cache system 220 and 240 can be a single-level cache system having a cache. It should be understood that the second computer system 200 can be configured in any other manner. The present invention is well suited for a cache, main memory, or other temporarily private data storage that implements a write back strategy. Moreover, it should be understood that the first and second processors 210 and 230 can share any memory system including, for example, a level 1 cache, a level 2 cache, a level 3 cache, a main memory, or a permanent storage. Alternatively, the processors could each reside in separate computer systems that share temporarily private data with other processors over a computer network. In this case, the memory system the processors share is the memory system formed by the coupling of each of the processors with their associated computer systems over a computer network.

Moreover, the second computer system 200 includes a first preemptive write back controller 290A coupled to the cache system 220, a second preemptive write back controller 290B coupled to the cache system 240, and a third preemptive write back controller 290C coupled to the main memory 250. Each preemptive write back controller is designed and optimized for operation with the respective memory system. It should be understood that the second computer system 200 can have a preemptive write back controller for each cache of each cache system 220 and 240. The preemptive write back controllers 290A and 290B and 290C preemptively initiate the cleaning of each cache system 220 and 240 and the main memory 250 in advance of the immediate requirement to do so (e.g., due to synchronization operation, the checkpointing operation, the context switch, the page fault or page replacement, etc.) by utilizing a list of lines, pages, words, memory locations, or sets of memory locations to possibly undergo this write back operation. In each cache system 220 and 240, the level 1 cache writes back to the level 2 cache. The level 2 cache writes back to the main memory 250. Alternatively, the level 2 cache writes back to the level 3 cache, etc., with the final level of cache writing back to the main memory 250. Alternatively, any level of the cache system or main memory or other temporarily private data storage may utilize a write through policy/strategy, as long as at least one of the memory systems coupled to the preemptive write back controller utilizes a write back policy/strategy. Alternatively, each cache system 220 and 240 simply writes back to the main memory 250. The main memory 250 writes back to the disk system 260. It should be understood that the preemptive write back controller does not have to be implemented with all the memory systems of the computer system. Moreover, each processor can bypass its respective cache system and interact directly with the main memory or any other memory system.

Figure 3:
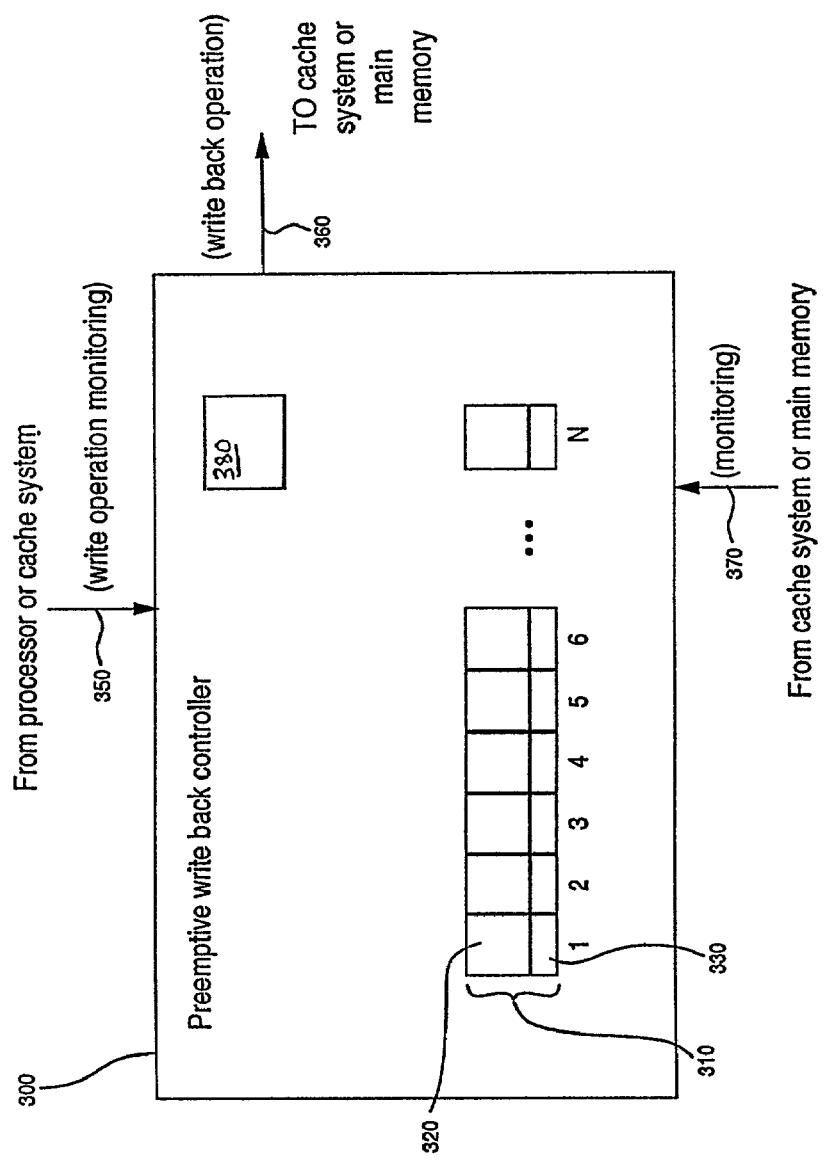
FIG. 3 illustrates a preemptive write back controller in accordance with an embodiment of the present invention.

FIG. 3 illustrates a preemptive write back controller 300 in accordance with an embodiment of the present invention. The preemptive write back controller 300 can be implemented in hardware, software, or any combination thereof. The preemptive write back controller 300 includes a list 310 of the lines, pages, words, memory locations, or sets of memory locations potentially requiring a write back (i.e., those which previously experienced a write operation into them) in a write back cache, write back main memory, or other write back temporarily private data storage. The present invention is well suited for a cache, main memory, or other temporarily private data storage that implements a write back strategy. Thus, the preemptive write back controller can initiate or force a preemptive cleaning of these write back memory location candidates (e.g., lines, pages, words, memory locations, or sets of memory locations). By cleaning dirty lines, pages, words, memory locations, or sets of memory locations at times when the cache, the main memory, other temporarily private data storage, the bus, etc. are less heavily utilized than at the time of the synchronization operation, the checkpointing operation, the context switch, the page fault or page replacement, etc., the operation of cleaning the cache, the main memory, or other temporarily private data storage will already be partially completed at the time that it becomes necessary to complete; thus it proceeds more quickly.

Checkpointing and context switches can force the write back of data in caches and/or main memory. In the case of the checkpointing operation, the preemptive write back controller is well suited for the situations where the processor(s) is unable to do productive work while the checkpoint is being formed. In the case of the context switch, the preemptive write back controller is well suited for the situations where the cache is required to be flushed during the context switch. Examples of where a cache may need to be flushed during a context switch are in situations where the cache is physically indexed or where the cache is virtually indexed but the cache does not have a process identifier stored with the tag in the cache. In the case of the page fault or page replacement, the preemptive write back controller is well suited for the situations where a page is replaced in memory, leading to activity (e.g., cleaning, flushing, etc.) in the cache and/or main memory. In the case of the synchronization operation, the preemptive write back controller may be well suited for the situations where the processor(s) has few write buffers.

The determination of when to begin cleaning the dirty lines, pages, words, memory locations, or sets of memory locations and at what pace to conduct this task are design choices. By cleaning the cache, the main memory, or other temporarily private data storage before cleaning is absolutely required, exceeding an optimal maximal threshold of utilization of a portion of the computer system is avoided. For example, bandwidth saturation and bottlenecks on the bus and latency and stalling of execution of instructions can be reduced or eliminated. Moreover, the bus(es), the processor, the memory system controllers, etc. can operate at more optimal levels of utilization rather than at high levels of utilization. Generally, avoiding a high level of utilization of the preemptive write back controller is not as much a concern as other portions of the computer system. Thus, the required memory updates can be done during times when the bus and other hardware involved are idle or less fully utilized than at the time of the synchronization operation, the checkpointing operation, the context switch, the page fault or page replacement, etc. This results in better distributed demand for and utilization of the buses and other portions of the computer system and a more uniform memory access pattern in time.

As illustrated in FIG. 3, the preemptive write back controller 300 is configured to initiate a memory system (e.g., the cache, the main memory, or other temporarily private data storage) via connection 360 to perform a write back operation such that to avoid exceeding an optimal maximal threshold of utilization of a portion of the computer system. For example, bandwidth saturation and bottlenecks on the bus and latency and stalling of execution of instructions can be reduced or eliminated. Moreover, the bus(es), the processor, the memory system controllers, etc. can operate at more optimal levels of utilization rather than at high levels of utilization. Moreover, the preemptive write back controller 300 includes a list 310 for storing a plurality of pointers 320, whereas each pointer represents a write back memory location candidate of the memory system. The preemptive write back controller initiates the memory system to perform said write back operation by selecting one of the plurality of pointers of the list 310 and providing a write back operation indication and the selected write back memory location candidate to the memory system via the connection 360. The preemptive write back controller can reduce power peaking and lower power consumption relative to other preemptive write back systems since it can remove the necessity of checking all memory locations for data requiring cleaning, since it can distribute more evenly in time the process of conducting write backs, and since it can provide faster cleaning or flushing at the moment these become necessary. The memory system may not need to perform the write back operation if in the memory system the selected write back memory location candidate has been marked invalid or has already been cleaned or has previously been evicted.

The preemptive write back controller can have a plurality of state data 380 associated with the operation of the preemptive write back controller. In addition, the list 310 may also include a plurality of state data 330 corresponding to each pointer 320. Examples of state data 330 include a tag, frequency data, LRU (least recently used) data, valid/invalid bit, timestamp, and way identification data (if the cache system is a multiple way associative cache system). The frequency data can represent how frequently a memory location has been accessed, written to, or read. Thus, the preemptive write back controller 300 can select one of the plurality of pointers 320 of the list 310 based on the state data, the frequency data, the LRU data, valid/invalid bit, timestamp, etc. Moreover, the preemptive write back controller 300 can select one of the plurality of pointers 320 of the list 310 without regard to the state data 330. Alternatively, the preemptive write back controller 300 can randomly select one of the plurality of pointers 320 of the list 310. The size of the list 310 is a design choice.

In an embodiment, the preemptive write back controller 300 includes a head pointer and a tail pointer, a tail pointer only, or a head pointer only to manage the list 310. Alternatively, the invalid/valid bit is utilized to manage the pointers of the list 310. Moreover, other methods can be used to keep track of the pointers of the list 310 such as linked lists.

Additionally, the preemptive write back controller 300 can use hashing to provide faster access to the list 310 and augment the performance of the preemptive write back controller 300. By using hashing, the preemptive write back controller 300 can quickly determine whether a specific pointer already exists in the list 310 to avoid creating a duplicate pointer. Moreover, hashing can be used in conjunction with the invalid/valid bit.

In practice, a pointer 320 is added to or stored in the list 310 when a write operation is performed to the memory system (e.g., the cache, the main memory, or other temporarily private data storage) corresponding to the preemptive write back controller 300. The preemptive write back controller 300 monitors via connection 350 whether a write operation is performed to the memory system. If a write operation is detected, the preemptive write back controller 300 forms a pointer 320 in the list 310 to point to the write address associated with the write operation.

In practice, a pointer 320 is deleted or invalidated from the list 310 when the preemptive write back controller 300 selects the pointer 320 from the list 310 and provides a write back operation indication and the selected write back memory location candidate to the memory system via the connection 360. Alternatively, the preemptive write back controller 300 communicates with a separate system (e.g., a processor, another memory controller, etc.) to initiate the write back operation in the memory system. Also, the preemptive write back controller 300 may monitor activity of the memory system via connection 370 to detect eviction of lines, pages, words, memory locations, or sets of memory locations or other relevant activity on memory locations or sets of memory locations so that to delete or invalidate the corresponding pointer 320 from the list 310.

The list 310 may be reset on the occurrence of any event that will force the cleaning or flushing of the entire memory system. Examples of these events may include a checkpointing operation, a context switch, and a page fault or page replacement. The list 310 can be reset by resetting the valid/invalid bit of the state data 330 corresponding to each pointer 320. Alternatively, the tail pointer or head pointer can be reset. Moreover, other methods can be used to reset the list 310.

If the list 310 is filled, the preemptive write back controller 300 can follow one of several courses of action. The preemptive write back controller 300 can provide a high priority write back indication and the selected write back memory location candidate to the memory system via the connection 360. Alternatively, the preemptive write back controller 300 can extend the list 310 by finding additional memory capacity. Moreover, the preemptive write back controller 300 can simply fail to add another pointer 320 to the list 310 until pointers have been removed from the list 310. Additionally, the preemptive write back controller 300 can also overwrite a randomly selected or specifically selected pointer and its associated state information with the data of the new pointer and its associated state information.

Concurrently with the above processes, the state data 330 associated with each pointer 320 may be updated, accessed, or invalidated. This can be done dependently or independently of the updates, accesses, or invalidations of the pointers 320.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A preemptive write back system comprising:
a preemptive write back controller configured to initiate a memory system to perform a preemptive write back operation, wherein said preemptive write back controller includes:
a list for storing a plurality of pointers, each pointer representing a write back memory location candidate of said memory system, wherein said preemptive write back controller initiates said memory system to perform said preemptive write back operation by selecting one of said plurality of pointers of said list, and wherein said list further includes a plurality of state data corresponding to each pointer.

2. A preemptive write back system as recited in claim 1 wherein said state data includes frequency data, and wherein said preemptive write back controller selects one of said plurality of pointers of said list based on said frequency data.

3. A preemptive write back system as recited in claim 1 wherein said state data includes least recently used (LRU) data, and wherein said preemptive write back controller selects one of said plurality of pointers of said list based on said LRU data.

4. A preemptive write back system as recited in claim 1 wherein said state data includes invalid/valid bit, and wherein said preemptive write back controller selects one of said plurality of pointers of said list based on said invalid/valid bit.

5. A preemptive write back system as recited in claim 1 wherein said preemptive write back controller selects one of said plurality of pointers of said list based on said state data.

6. A preemptive write back system as recited in claim 1 wherein said preemptive write back controller randomly selects one of said plurality of pointers of said list.

7. A preemptive write back system as recited in claim 1 wherein said preemptive write back controller selects one of said plurality of pointers of said list without regard to said state data.

8. A preemptive write back system comprising:
a preemptive write back controller configured to initiate a memory system to perform a preemptive write back operation, wherein said preemptive write back controller includes:
a list for storing a plurality of pointers, each pointer representing a write back memory location candidate of said memory system, wherein said preemptive write back controller initiates said memory system to perform said preemptive write back operation by selecting one of said plurality of pointers of said list, and further including a plurality of state data associated with said preemptive write back controller.

9. A preemptive write back system comprising:
a preemptive write back controller configured to initiate a memory system to perform a preemptive write back operation, wherein said preemptive write back controller includes:
a list for storing a plurality of pointers, each pointer representing a write back memory location candidate of said memory system, wherein said preemptive write back controller initiates said memory system to perform said preemptive write back operation by selecting one of said plurality of pointers of said list, and
wherein said preemptive write back controller includes one of a head pointer and a tail pointer, a tail pointer, and a head pointer.

10. A preemptive write back system comprising:
a preemptive write back controller configured to initiate a memory system to perform a preemptive write back operation, wherein said preemptive write back controller includes:
a list for storing a plurality of pointers, each pointer representing a write back memory location candidate of said memory system, wherein said preemptive write back controller initiates said memory system to perform said preemptive write back operation by selecting one of said plurality of pointers of said list, and
wherein said memory system is one of a level 1 cache, a level 2 cache, a level 3 cache, and a main memory.

11. A preemptive write back system comprising:
a preemptive write back controller configured to initiate a memory system to perform a preemptive write back operation, wherein said preemptive write back controller includes:
a list for storing a plurality of pointers, each pointer representing a write back memory location candidate of said memory system, wherein said preemptive write back controller initiates said memory system to perform said preemptive write back operation by selecting one of said plurality of pointers of said list, and
wherein said memory system is a cache level of a multiple-level cache system.

12. A preemptive write back system comprising:
a preemptive write back controller configured to initiate a memory system to perform a preemptive write back operation, wherein said preemptive write back controller includes:
a list for storing a plurality of pointers, each pointer representing a write back memory location candidate of said memory system, wherein said preemptive write back controller initiates said memory system to perform said preemptive write back operation by selecting one of said plurality of pointers of said list, and
wherein said memory system is a scratch pad memory.

13. A preemptive write back system comprising:
a preemptive write back controller configured to initiate a memory system to perform a preemptive write back operation, wherein said preemptive write back controller includes:
a list for storing a plurality of pointers, each pointer representing a write back memory location candidate of said memory system, wherein said preemptive write back controller initiates said memory system to perform said preemptive write back operation by selecting one of said plurality of pointers of said list, and
wherein said preemptive write back controller uses hashing on said list.

14. A preemptive write back system comprising:
a preemptive write back controller configured to initiate a memory system to perform a preemptive write back operation, wherein said preemptive write back controller includes:
a list for storing a plurality of pointers, each pointer representing a write back memory location candidate of said memory system, wherein said preemptive write back controller initiates said memory system to perform said preemptive write back operation by selecting one of said plurality of pointers of said list, and
wherein said preemptive write back controller uses a linked list to implement said list.

15. A preemptive write back system comprising:
a preemptive write back controller configured to initiate a memory system to perform a preemptive write back operation, wherein said preemptive write back controller includes:
a list for storing a plurality of pointers, each pointer representing a write back memory location candidate of said memory system, wherein said preemptive write back controller initiates said memory system to perform said preemptive write back operation by selecting one of said plurality of pointers of said list, and
wherein said preemptive write back controller uses a linked list to implement said list.

16. A preemptive write back system comprising:
a preemptive write back controller configured to initiate a memory system to perform a preemptive write back operation, wherein said preemptive write back controller includes:
a list for storing a plurality of pointers, each pointer representing a write back memory location candidate of said memory system, wherein said preemptive write back controller initiates said memory system to perform said preemptive write back operation by selecting one of said plurality of pointers of said list, and
wherein said preemptive write back controller communicates with a separate system to initiate said write back operation in said memory system.

17. A preemptive write back system as recited in claim 16 wherein said separate system is a processor.

18. A preemptive write back system as recited in claim 16 wherein said separate system is another memory controller.

19. A method of performing memory system write back operations, comprising:
a) providing a list for storing a plurality of pointers, each pointer representing a write back memory location candidate of a memory system, wherein said providing said list comprises:
adding a pointer to said list in response to a memory access and causing said pointer to reference a memory location involved with said memory access, and
b) initiating said memory system to perform a preemptive write back operation by selecting one of said plurality of pointers of said list, wherein said list removes necessity to check for write back candidacy all memory locations in said memory system that are subject to be a write back candidate.

20. A method as recited in claim 19 wherein said memory system is one of a level 1 cache, a level 2 cache, a level 3 cache, and a main memory.

21. A method as recited in claim 19 wherein said memory system is a cache level of a multiple-level cache system.

22. A method as recited in claim 19 wherein said memory system is a temporarily private data storage.

23. A method as recited in claim 19 wherein said memory system is a scratch pad memory.

24. A method as recited in claim 19 wherein said list further includes a plurality of state data corresponding to each pointer.

25. A method as recited in claim 24 wherein said state data includes frequency data, and wherein said initiating includes selecting one of said plurality of pointers of said list based on said frequency data.

26. A method as recited in claim 24 wherein said state data includes least recently used (LRU) data, and wherein said initiating includes selecting one of said plurality of pointers of said list based on said LRU data.

27. A method as recited in claim 24 wherein said state data includes invalid/valid bit, and wherein said initiating includes selecting one of said plurality of pointers of said list based on said invalid/valid bit.

28. A method as recited in claim 24 wherein said initiating includes selecting one of said plurality of pointers of said list based on said state data.

29. A method as recited in claim 24 wherein said initiating includes randomly selecting one of said plurality of pointers of said list.

30. A method as recited in claim 24 wherein said initiating includes selecting one of said plurality of pointers of said list without regard to said state data.

31. A method as recited in claim 19 wherein said providing includes using one of a head pointer and a tail pointer, a tail pointer, and a head pointer to manage said list.

32. A method as recited in claim 19 wherein said providing includes using hashing on said list.

33. A method as recited in claim 19 wherein said providing includes using a linked list to implement said list.

34. A method as recited in claim 19 wherein said memory system is a set of temporarily private data storages each associated with one or more of a plurality of processors coupled to a network.

35. A method as recited in claim 19 further including providing a plurality of state data.

36. A method as recited in claim 19 wherein said initiating includes communicating with a separate system to initiate said write back operation in said memory system.

37. A method as recited in claim 36 wherein said separate system is a processor.

38. A method as recited in claim 36 wherein said separate system is another memory controller.

39. A computer system comprising:
a bus;
a memory system coupled to said bus; and
a preemptive write back controller configured to:
monitor write operations involving said memory system;
add a pointer to a list of a plurality of pointers in response to detecting a write operation and to cause said pointer to reference a memory location involved with the write operation; and
initiate said memory system to perform a preemptive write back operation by selecting one of said plurality of pointers of said list.

40. A computer system as recited in claim 39 wherein said list further includes a plurality of state data corresponding to each pointer.

41. A computer system as recited in claim 40 wherein said state data includes frequency data, and wherein said preemptive write back controller selects one of said plurality of pointers of said list based on said frequency data.

42. A computer system as recited in claim 40 wherein said state data includes least recently used (LRU) data, and wherein said selecting one of said plurality of pointers of said list is based on said LRU data.

43. A computer system as recited in claim 40 wherein said state data includes an invalid/valid bit, and wherein said selecting one of said plurality of pointers of said list is based on said invalid/valid bit.

44. A computer system as recited in claim 40 wherein said selecting one of said plurality of pointers of said list is based on said state data.

45. A computer system as recited in claim 40 wherein said selecting one of said plurality of pointers of said list is a random selection.

46. A computer system as recited in claim 40 wherein said selecting one of said plurality of pointers of said list is performed without regard to said state data.

47. A computer system as recited in claim 39 further including a plurality of state data associated with said preemptive write back controller.

48. A computer system as recited in claim 39 wherein said list of said plurality of pointers has associated therewith one of a head pointer and a tail pointer, a tail pointer, and a head pointer.

49. A computer system as recited in claim 39 wherein said memory system is one of a level 1 cache, a level 2 cache, a level 3 cache, and a main memory.

50. A computer system as recited in claim 39 wherein said memory system is a cache level of a multiple-level cache system.

51. A computer system as recited in claim 39 wherein said memory system is a temporarily private data storage.

52. A computer system as recited in claim 39 wherein said memory system is a scratch pad memory.

53. A computer system as recited in claim 39 wherein said preemptive write back controller uses hashing on said list.

54. A computer system as recited in claim 39 wherein said preemptive write back controller uses a linked list to implement said list.

55. A computer system as recited in claim 39 further comprising a processor.

56. A computer system as recited in claim 39 further comprising a plurality of processors.

57. A computer system as recited in claim 39 wherein said preemptive write back controller communicates with a separate system to initiate said write back operation in said memory system.

58. A computer system as recited in claim 57 wherein said separate system is a processor.

59. A computer system as recited in claim 57 wherein said separate system is another memory controller.

60. A computer system as recited in claim 39 wherein said preemptive write back controller is further configured to add said pointer to said list prior to an initial decision to write back to said memory location.

* * * * *

UNITED STATES PATENT AND TRADEMARK OFFICE
CERTIFICATE OF CORRECTION

PATENT NO. : 7,472,230 B2
APPLICATION NO. : 09/952994
DATED : December 30, 2008
INVENTOR(S) : Manohar K. Prabhu It is certified that error appears in the above-identified patent and that said Letters Patent is hereby corrected as shown below:

In column 11, lines 28-29, in Claim 31, delete "and a tall pointer, a tall pointer" and insert -- and a tail pointer, a tail pointer --, therefor.

In column 12, line 27, in Claim 48, delete "and a tall pointer, a tall pointer" and insert -- and a tail pointer, a tail pointer --, therefor.

Signed and Sealed this

Fourteenth Day of July, 2009

JOHN DOLL
*Acting Director of the United States Patent and Trademark Office*